(12) United States Patent
Hu et al.

(10) Patent No.: US 10,393,917 B2
(45) Date of Patent: Aug. 27, 2019

(54) CEMENT EVALUATION WITH X-RAY TOMOGRAPHY

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 157 days.

(21) Appl. No.: 15/533,626

(22) PCT Filed: Mar. 26, 2015

(86) PCT No.: PCT/US2015/022729
§ 371 (c)(1),
(2) Date: Jun. 6, 2017

(87) PCT Pub. No.: WO2016/153523
PCT Pub. Date: Sep. 29, 2016

(65) Prior Publication Data
US 2018/0329110 A1    Nov. 15, 2018

(51) Int. Cl.
*G01V 5/12* (2006.01)
*G01V 5/08* (2006.01)
(Continued)

(52) U.S. Cl.
CPC .......... *G01V 5/125* (2013.01); *E21B 47/0005* (2013.01); *G01V 5/08* (2013.01); *E21B 47/08* (2013.01); *G01V 5/107* (2013.01)

(58) Field of Classification Search
CPC ...................................................... G01V 5/125
See application file for complete search history.

(56) References Cited

U.S. PATENT DOCUMENTS

| 4,462,082 A | 7/1984 | Thiele et al. |
| 4,576,034 A | 3/1986 | Ferree et al. |

(Continued)

FOREIGN PATENT DOCUMENTS

| EP | 0159484 A1 | 10/1985 |
| EP | 1522848 A1 | 4/2005 |

(Continued)

OTHER PUBLICATIONS

Carey et al., Analysis and performance of oil well cement, Apr. 2007, International Journal of Greenhouse Gas Control, vol. 1, Iss. 1, pp. 75-85 (Year: 2007).*

(Continued)

*Primary Examiner* — David P Porta
*Assistant Examiner* — Jeremy S Valentiner
(74) *Attorney, Agent, or Firm* — Gilliam IP PLLC

(57) ABSTRACT

A tool can include an X-ray tomography device to evaluate cement in a downhole environment. The X-ray tomography device includes an X-ray beam source configured to transmit an X-ray beam at a first predetermined angle. The beam angle may be set by a capillary device coupled to the X-ray beam source. An energy dispersive, multi-pixel photon detector is configured to count detected backscatter photons received at a second predetermined angle and determine an energy spectrum for the detected photons. A density map of the cement may be generated in response to the number of detected photons. Additional apparatus, systems, and methods are disclosed.

16 Claims, 8 Drawing Sheets

(51) Int. Cl.
*G01V 5/10* (2006.01)
*E21B 47/00* (2012.01)
*E21B 47/08* (2012.01)

(56) References Cited

U.S. PATENT DOCUMENTS

| | | | |
|---|---|---|---|
| 4,825,454 A * | 4/1989 | Annis | A61B 6/483 |
| | | | 250/363.01 |
| 5,486,695 A | 1/1996 | Schultz et al. | |
| 7,587,936 B2 | 9/2009 | Wei | |
| 8,321,131 B2 | 11/2012 | Case | |
| 2001/0035312 A1 | 11/2001 | Han et al. | |
| 2004/0000401 A1 | 1/2004 | Sale et al. | |
| 2008/0186805 A1 | 8/2008 | Han | |
| 2010/0076688 A1 | 3/2010 | Moake | |
| 2010/0204942 A1 * | 8/2010 | Danielsson | G01T 1/242 |
| | | | 702/85 |
| 2011/0191027 A1 | 8/2011 | Pfutzner et al. | |
| 2011/0284732 A1 | 11/2011 | Korkin et al. | |
| 2012/0059587 A1 | 3/2012 | Marsh et al. | |
| 2012/0119077 A1 * | 5/2012 | Smaardyk | E21B 43/04 |
| | | | 250/269.3 |
| 2012/0138782 A1 | 6/2012 | Simon et al. | |
| 2012/0192640 A1 | 8/2012 | Minh et al. | |
| 2013/0202090 A1 * | 8/2013 | Belcher | G01N 23/203 |
| | | | 378/87 |
| 2013/0215715 A1 | 8/2013 | Hollstein et al. | |
| 2015/0021461 A1 * | 1/2015 | Nishihara | H01L 27/14609 |
| | | | 250/208.1 |
| 2017/0023696 A1 * | 1/2017 | Morton | G01N 23/203 |

FOREIGN PATENT DOCUMENTS

| | | |
|---|---|---|
| EP | 1922571 B1 | 8/2012 |
| WO | 2009151350 A1 | 12/2009 |
| WO | 2012058579 A2 | 5/2012 |
| WO | 2016153524 A1 | 9/2016 |
| WO | 2016153566 A1 | 9/2016 |
| WO | 2016153567 A1 | 9/2016 |

OTHER PUBLICATIONS

European Application Serial No. 15886678.0; Extended European Search Report; dated Jun. 19, 2018, 7 pages.
"International Application Serial No. PCT/US2015/022729, International Search Report dated Dec. 18, 2015", 3 pgs.
"International Application Serial No. PCT/US2015/022729, Written Opinion dated Dec. 18, 2015", 10 pgs.
"International Application Serial No. PCT/US2015/022748, International Search Report dated Dec. 24, 2015", 3 pgs.
"International Application Serial No. PCT/US2015/022748, Written Opinion dated Dec. 24, 2015", 6 pgs.
"International Application Serial No. PCT/US2015/063693, International Search Report dated Feb. 3, 2016", 3 pgs.
"International Application Serial No. PCT/US2015/063693, Written Opinion dated Feb. 3, 2016", 4 pgs.
"International Application Serial No. PCT/US2015/063711, International Search Report dated Mar. 15, 2016", 3 pgs.
"International Application Serial No. PCT/US2015/063711, Written Opinion dated Mar. 15, 2016", 9 pgs.
Moake, et al., "Standoff and Caliper Measurements While Drilling Using a New Formation-Evaluation Tool With Three Ultrasonic Transducers", SPE Drilling & Completion, Jun. 1, 1995 00:00:00.0, 104-111.
EP Application Serial No. 15886712.7, Extended European Search Report, dated Nov. 19, 2018, 7 pages.
EP Application Serial No. 15886711.9, Extended European Search Report, dated Oct. 23, 2018, 7 pages.

* cited by examiner

CEMENT EVALUATION WITH X-RAY TOMOGRAPHY

BACKGROUND

Natural resources such as gas, oil, and water residing in a geological formation may be recovered by drilling a wellbore into the formation while circulating a drilling fluid in the wellbore. After terminating the circulation of the drilling fluid, a string of pipe (e.g., casing) is run into the wellbore in order to provide structural support for the wellbore sides. The casing may be metal (e.g., steel).

Primary cementing may be performed whereby a cement slurry is injected into the annulus between the casing and the geological formation. The cement is permitted to set into a hard mass (i.e., a sheath) to thereby support the string of pipe within the wellbore and seal the annulus.

To determine the condition of the hardened cement, an evaluation log was introduced in the 1960s, using sonic attenuation measurements. Through years of evolution, acoustic solutions now include sonic attenuation measurements with borehole compensation and ultrasonic impedance imaging with azimuthal sensitivity. These evaluation technologies are being challenged to meet new environmental conditions (such as wellbores located in deep water) and new regulatory requirements. The acoustic impedance contrasts between heavy drilling mud and light cement, for example, may be close to or beyond the measurement sensitivity limitations of existing sensors, while heavy casings present an additional technical barrier for traditional acoustic solutions.

DETAILED DESCRIPTION

Some of the challenges noted above, as well as others, can be addressed by implementing the apparatus, systems, and methods described herein. In many embodiments, an X-ray backscattering process may be used for cement evaluation using an X-ray source and a photon detector. The resulting spectrometric information may be used to investigate possible gaps, bubbles, or other features behind casing material.

Figure 1:
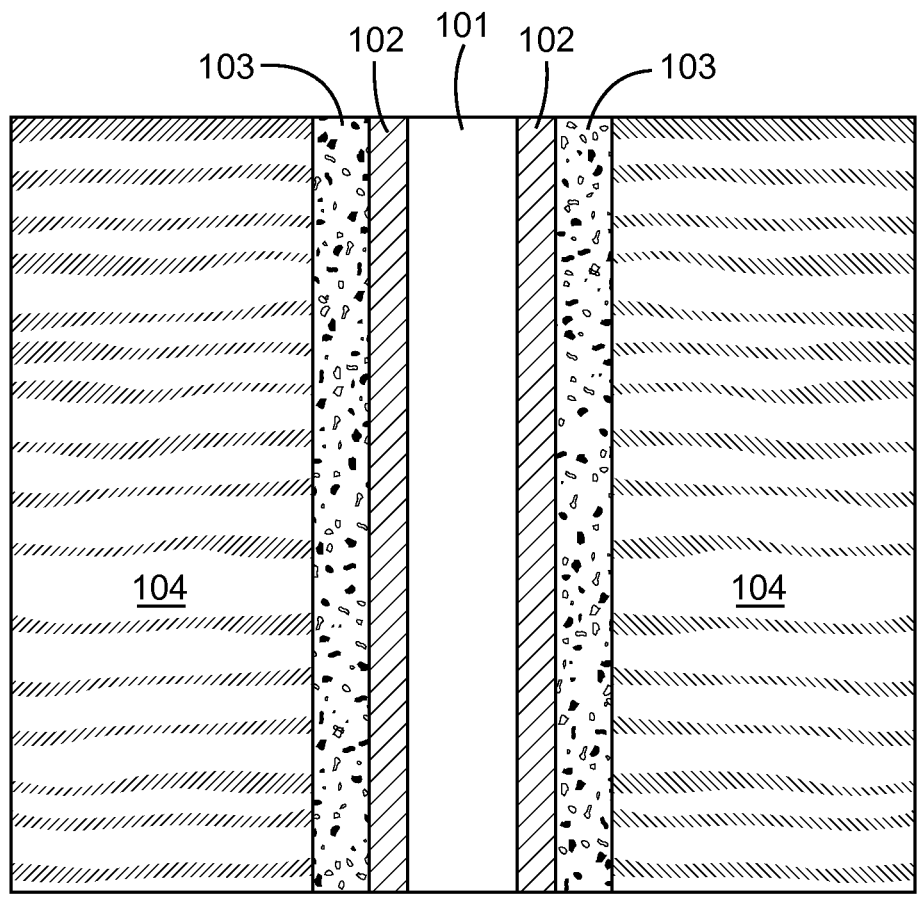
FIG. 1 is a cross-sectional diagram of a cased hole completion geometry, according to various embodiments of the invention.

FIG. 1 is a cross-sectional diagram of a cased hole completion geometry, according to various embodiments of the invention. The cased-hole completion geometry includes a borehole 101 formed in a geological formation 104. The borehole 101 is lined with the casing 102 that is often a metal (e.g., steel). Cement 103 is injected into the borehole 101 such that, after it reaches the bottom of the borehole, it returns upward in the annulus region between the casing 102 and the formation 104. Thus, the cement stabilizes the casing 102 within the borehole 101.

Due to possible imperfections introduced into the cement 103 during construction and/or subsequent wear damage caused by use of the borehole, it would be desirable to perform non-destructive testing of the cement. Using an x-ray tomography device in the borehole, possible air gaps, bubbles, and/or other imperfections in the cement may be discovered. Various embodiments of the invention may be used to detect the present of these imperfections.

Figure 2:
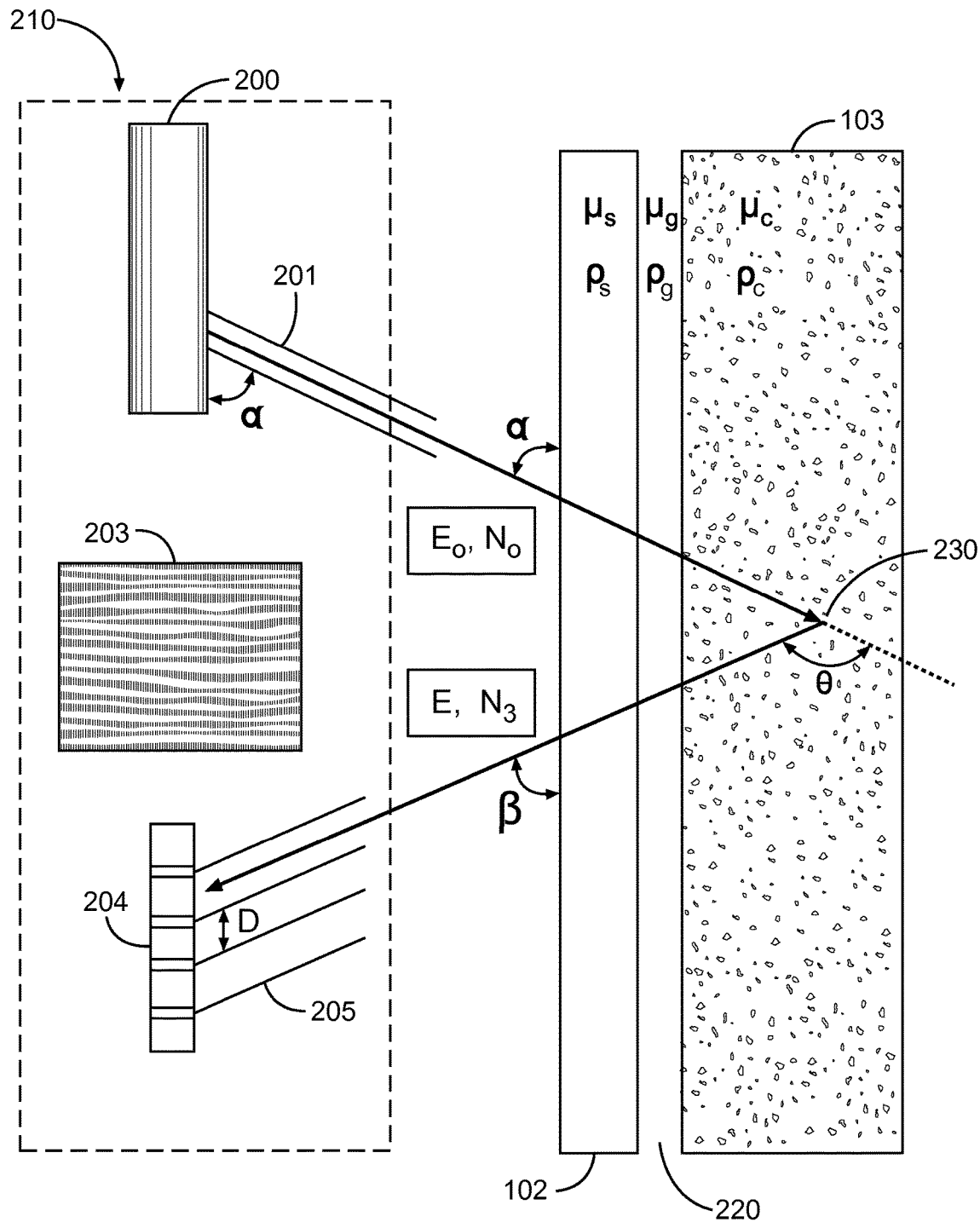
FIG. 2 is a block diagram showing an x-ray tomography device within a cased hole, according to various embodiments of the invention.

FIG. 2 is a block diagram showing an x-ray tomography device within a cased hole, according to various embodiments of the invention. The device 210 uses an X-ray backscattering process to penetrate the casing material, with reflections back to an X-ray detector, to generate a density map of the casing and the cement in order to investigate defects behind the casing. The device 210 may be located in a wireline tool housing to be used during a wireline logging operation (see FIG. 7) or a drill string tool housing to be used during a logging while drilling (LWD) operation (see FIG. 8).

The X-ray tomography device 210 includes an x-ray source 200 (e.g., X-ray tube) for generating an X-ray beam (i.e., a photon beam) through the casing 102 and into the cement 103. The X-ray source 200 may be a relatively high flux X-ray source (e.g., >$10^9$ photon count per second) using a relatively high tube voltage (e.g., 300 keV). The X-ray source 200 may operate in continuous or pulsed modes. Heat generated by source operation may be dissipated through cooling fluid (e.g., air, water, oil).

The X-ray beam becomes broader along its path towards the casing. In order to keep the beam width relatively small (as compared to the raw beam emanating from the X-ray source) and concentrated to one location in the cement 103, a capillary device 201 may be placed in front of the X-ray source 200. The capillary device 201 confines the coverage width of the X-ray beam without reducing the intensity of the beam. The capillary device 201 is also configured to direct the X-ray beam from the X-ray source at an angle α (as measured from vertical), such that the beam enters the casing at the same angle. The X-ray beam then enters the casing 102, the gap material 220 (if any) and the cement 103.

The photons in the beam react with the cement 103, which scatters the photons back through the gap material 220 (if any) and the casing 102. In order to detect only those photons exiting the cement/gap/casing at a desired angle β, a slant-hole collimator 205 is located in front of a detector 204. Thus only those photons traveling in a direction that is parallel to the collimator 205 may enter the collimator 205 and reach the detector 204.

Figure 5:
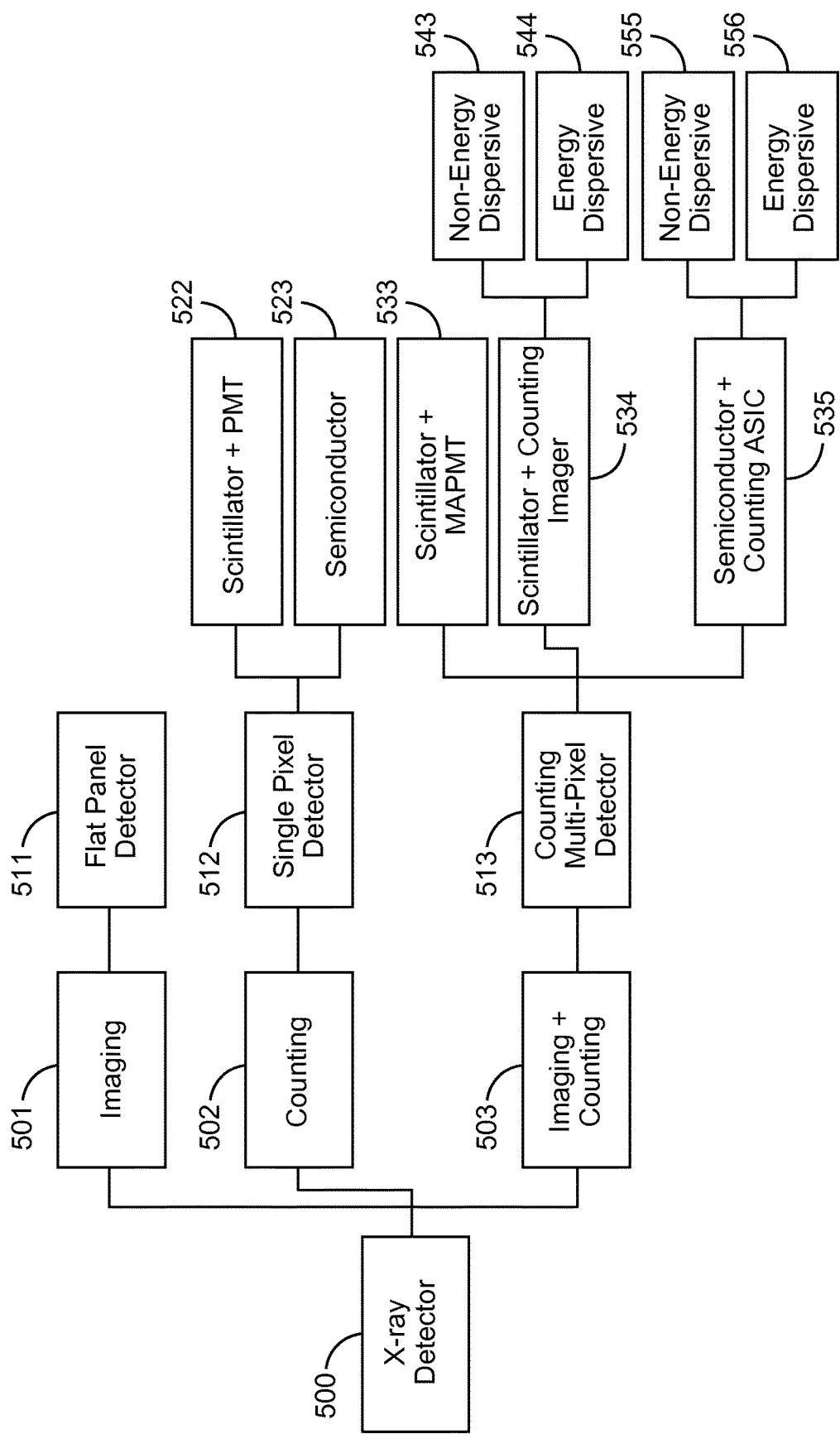
FIG. 5 is a diagram showing classifications of X-ray detectors, according to various embodiments of the invention.

The detector 204 is a multi-pixel detector configured to perform energy-dispersive photon counting. Each pixel is shown having a diameter D. The multi-pixel capability of the detector 204 records the energy spectrum at different depths in the wellbore with a single measurement. The photon count capability records the photon count arriving at each pixel and the energy-dispersive capability sorts the count into different energy bins and generates a spectrum. Various detector embodiments are shown in FIG. 5 and discussed subsequently.

A radiation shield 203 is located between the X-ray source 200 and the detector 204. The shield 203 blocks photons from traveling directly from the X-ray source 200 to the detector 204 without passing through the cement 103. The radiation shield 203 may be any photon blocking material (e.g., tungsten, lead) appropriate for blocking photons. For example, a photon blocking metal may be used as the radiation shield 203.

The photons entering the cement 130 are reflected back from certain points 230 in the cement 103. Although there are many, only one of these points is illustrated to provide clarity in the illustration. As the X-ray tomography tool rotates in the azimuthal direction in the wellbore, this point 230 moves around the cement encircling the wellbore so that the entire diameter of the cement is investigated as the tool moves through the wellbore.

Also noted in FIG. 2 are representations of the photon energies and counts prior to entering the casing 102 as well as the photon energies and counts after reacting with the cement 103 and gap material 220 (if present) and exiting the casing 102. For example, $E_0$ represents the energy of the photons prior to entering the casing 102 and $N_0$ represents the count of photons. Similarly, E represents the energy of the photons exiting the casing 102 and $N_3$ represents the count of photons.

Representations of the mass attenuation coefficients of each of the material(s) comprising casing 102, cement 103, and gap material 220 (if any), respectively, are illustrated in FIG. 2 for subsequent discussion. For example, $\mu_s$ represents the attenuation of the casing, $\mu_g$ represents the attenuation of the gap (if present), and $\mu_c$ represents the attenuation of the cement.

Representations of the densities of each of the material(s) comprising casing 102, cement 103, respectively, are illustrated in FIG. 2 for subsequent discussion. For example, $\rho_x$ represents the density of the casing, $\rho_g$ represents the density of the gap (if present), and $\rho_c$ represents the density of the cement.

The intensity of an incident X-ray beam is attenuated by casing, gap materials (if any), and cement through elastic and inelastic interaction. The inelastic interaction includes photoelectric absorption, Compton scattering and pair production. In the expected range of X-ray energy (less than 300 keV), photoelectric absorption and Compton scattering are the relevant inelastic interactions. The total mass attenuation coefficient is determined by:

$$\mu = \mu_{elastic} + \mu_{photoelectric} + \mu_{compton}$$

where $\mu_{elastic}$ is the mass attenuation coefficient for elastic scattering, $\mu_{photoelectric}$ is the mass attenuation coefficient for photoelectric absorption, and $\mu_{compton}$ is the mass attenuation coefficient for Compton scattering.

The total intensity attenuation is given by:

$$N = N_0 e^{-\mu \rho l}$$

where $\rho$ is the density of material and l is the distance of photon travelling inside the particular material (e.g., steel, air, water, cement).

When there are various materials along the path, the total intensity attenuation is written as:

$$N = N_0 e^{-\Sigma_i \mu_i \rho_i l_i}$$

where i is the count for each material.

For the medium-high energy X-ray photons, the Compton scattering process dominates. The incident photons interact with the electrons inside cement (or gap materials) and get scattered away from its original direction. The scattered photon energy can be described by the Compton equation:

$$E = \frac{E_0}{1 + \frac{E_0}{m_0 c^2}(1 - \cos\theta)}$$

where $E_0$ is the incident photon energy, $m_0$ is the rest mass of electrons, c is the speed of light, and $\theta$ is the scattering angle.

After the interaction, the photons have a probability of being scattered in any direction. The angular distribution of the scattering probability is described by the Klein-Nishima formula:

$$\frac{d\sigma}{d\Omega} = r_0^2 \left(\frac{E^2}{E_0^2}\right)\left(\frac{E}{E_0} + \frac{E_0}{E} - \sin(\theta)^2\right)$$

where $r_0$ is the classical electron radius, $E_0$ is the incident photon energy, E is the energy of scattered photons, $\theta$ is the scattering angle, and $\Omega$ is the solid angle.

With reference to FIG. 2, the percentage of photons scattered at the angle toward a single detector pixel is given by:

$$R = \frac{d\sigma}{d\Omega} \Omega \rho D \frac{\sin\beta}{\sin(\alpha + \beta)}$$

where $\Omega$ is the solid angle of the detector 204 as seen from the scattering point 230, D is the diameter of the collimator 205, $\rho$ is the density of the scattering media, $\alpha$ is the incident beam angle, and $\beta$ is the collimator angle. The total photon count detected at each pixel is the number of photons scattered toward the detector direction after intensity attenuation in the forward-passing and back-scattering path. These angles are shown in FIG. 2.

Figure 3:
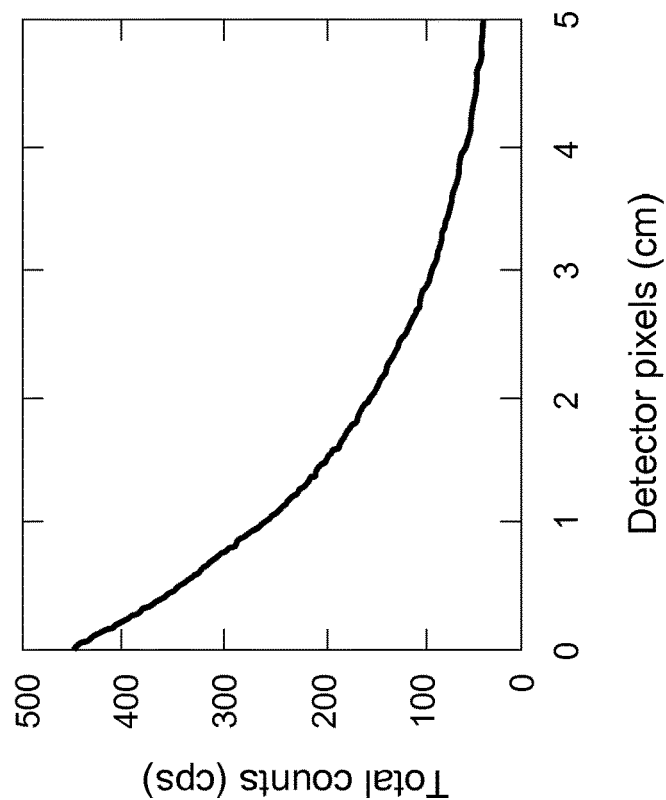
FIG. 3 is a plot showing the modeling result of total detected photon counts without a gap between the casing and the cement, according to various embodiments of the invention.

FIG. 3 is a plot showing the modeling result of total detected photon counts without a gap between the casing and the cement, according to various embodiments of the invention. The plot includes the total photon count, in counts per second (cps) along the y-axis versus a detector pixel distance (pixel location) from a reference point 0 (e.g., top of detector), in centimeters (cm) along the x-axis. This plot shows that there is no increase in the reflected photon count as a result of a change in material density due to a gap being present. This plot may be contrasted to the plot of FIG. 4 showing photon counts with a gap.

Figure 4:
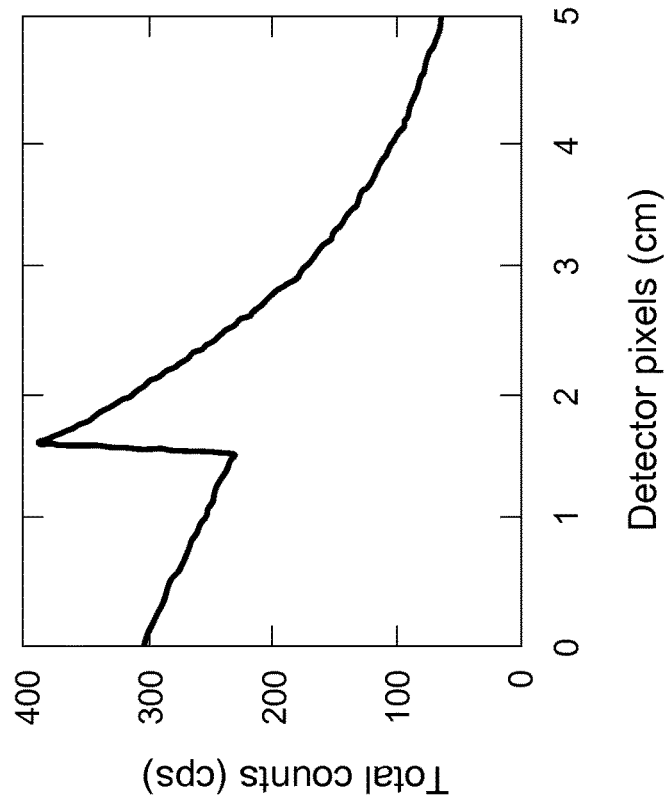
FIG. 4 is a plot showing the modeling result of total detected photon counts with a gap between the casing and the cement, according to various embodiments of the invention.

FIG. 4 is a plot showing the modeling result of total detected photon counts with a gap between the casing and the cement, according to various embodiments of the invention. The plot includes the total photon count, in counts per second (cps) along the y-axis versus a detector pixel distance (pixel location) from a reference point 0 (e.g., top of detector), in centimeters (cm) along the x-axis. In the illustrated embodiment, the gap is assumed to be filled with water (1 g/cm³). This plot shows an increase of the photon count between 1 and 2 cm from the reference at the location of the gap. Thus, the gap causes the detector pixel total photon count to respond (e.g., increase). Detecting such an increase in the total photon count may indicate a void in the cement or a gap between the cement and the casing. As the X-ray tomography tool rotates and moves within the borehole, a density map may be constructed using this information.

FIG. 5 is a diagram showing classifications of X-ray detectors, according to various embodiments of the invention. In general, there are three types of X-ray detector 500: imaging 501, counting 502, and imaging with counting ability 503.

X-ray imaging detectors 501 collect a total charge produced by the incident X-ray photons over a period of time. X-ray imaging detectors 501 may generate a two-dimensional image of the object but may not detect the photon energy information. Examples of X-ray imaging detectors 501 include flat panel imaging detectors 511 used in medical and non-destructive testing industries.

X-ray counting detectors 502 generate a count of the number of detected incident photons according to photon energies. This information may be used to generate an energy spectrum of the detected X-ray photons. The X-ray counting detector 502 may provide spectrum information for the detected photons but may not have a sensitivity to the detected location on the detector. Examples of X-ray counting detectors 502 include single pixel detectors 512, such as a scintillator, coupled to a photomultiplier tube 522 and a semiconductor photo diode 523.

X-ray imaging and counting detectors 503 combine the advantages of the above two types of detectors 501, 502. The imaging and counting detectors 503 are often configured as counting multi-pixel detectors 513 to produce images of the detected photons with position information for each detected photon. In this type of detector, each pixel can count every incident photon.

Due to complexity of fabrication, some sub-types of counting multi-pixel detectors 513 may only operate to count photons above a particular energy threshold. These types of detectors are considered non-energy-dispersive detectors (i.e., cannot differentiate the energy of detected photons). Counting multi-pixel detectors 513 that can sort photons into different energy categories and generate a full spectrum are considered energy-dispersive detectors (i.e., can differentiate the energy of detected photons, thus resulting in a received spectrum of photon energies).

In some embodiments, the detector 204 (see FIG. 2) may comprise an energy-dispersive photon counting multi-pixel detector. There are a plurality of types of such a detector.

One detector of this type couples a scintillator (continuous or pixelated) with a multi-anode photomultiplier tube (MAPMT) 533. The MAPMT is position-sensitive and records the photon counts and energy information through a multiple-channel (e.g., 4 channels, 8 channels) multi-channel analyzer (MCA).

Another detector of this type couples a scintillator (continuous or pixelated) with a counting imager 534 (e.g., complementary metal oxide semiconductor (CMOS) imager, charged coupled device (CCD)). Such a detector 534 may be non-energy dispersive 543 or energy dispersive 544.

Yet another detector of this type may be constructed by bump bonding a pixelated semiconductor chip to a solid state counting application specific integrated circuit (ASIC) readout 535. The semiconductor chip may comprise Cd(Zn) Te or HgI with pixelated Ohmic or Schottky contacts. The ASIC readout is designed to provide arrays of pixels with multiple energy categories per channel and may be fabricated with CMOS technology.

A detector 535 of this type may be non-energy dispersive 555 or energy dispersive 556. The energy-dispersive multi-pixel photon counting detector 556 may achieve high image contrast through photon counting and materials information may be extracted through the spectrum information.

Figure 6:
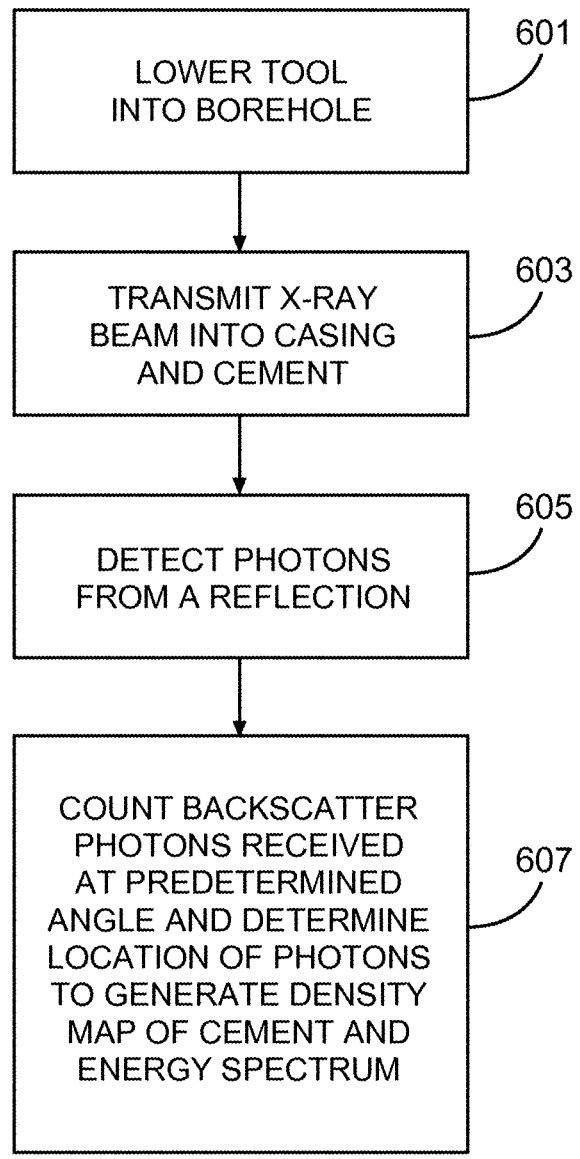
FIG. 6 is a flowchart of a method for performing X-ray inspection of the cement in a downhole environment, according to various embodiments of the invention.

FIG. 6 is a flowchart of a method for performing X-ray inspection of the cement in a downhole environment, according to various embodiments of the invention. In block 601, a tool comprising the X-ray tomography device is lowered into the wellbore to be inspected. The tool may be part of a wireline tool or a drill string tool, as described subsequently.

In block 603, an X-ray beam is transmitted into the wellbore in the direction of the casing and cement. This transmission may be performed while the tool is rotating in the azimuthal direction so that a three dimensional mapping of the cement density at that elevation in the wellbore may be performed.

In block 605, a photon detector (e.g., an energy dispersive multi-pixel area detector) is used with a collimator to detect backscatter photons from one or more reflection points in the cement. As discussed previously, only those photons that are reflected back at the angle determined by the collimator are detected, thus providing the detector with an image and photon count of a particular reflection point in the cement.

The system measurement sensitivity can be changed by adjusting X-ray source power, X-ray source capillary angle and detector collimator angle. These changes may be accomplished to provide measurements through substantially the entire thickness of the cement.

In block 607, the backscatter photons received from the reflection point in the cement, at the angle of the collimator, are counted. The quantity of photons provides an indication of density, as seen previously with respect to FIGS. 3 and 4. For example, if the photon count increases at a particular point, this may be due to a void in the cement. The energy dispersive multi-pixel photon detector may also determine a pixel location on the detector for the detected photons to generate a density map of the cement and measure a three-dimensional energy spectrum for the backscattered photons. This information may be used to determine elemental composition in the wellbore.

For example, abnormalities inside the cement may be determined and/or quantified based on comparing photon count-rate differences between measurements for each pixel at different depths. In some embodiments, the abnormalities may be determined and/or quantified by comparing count-rate differences between measurements for each pixel at different depths and predicted measurements for those respective depths. Still further embodiments may be realized.

Figure 7:
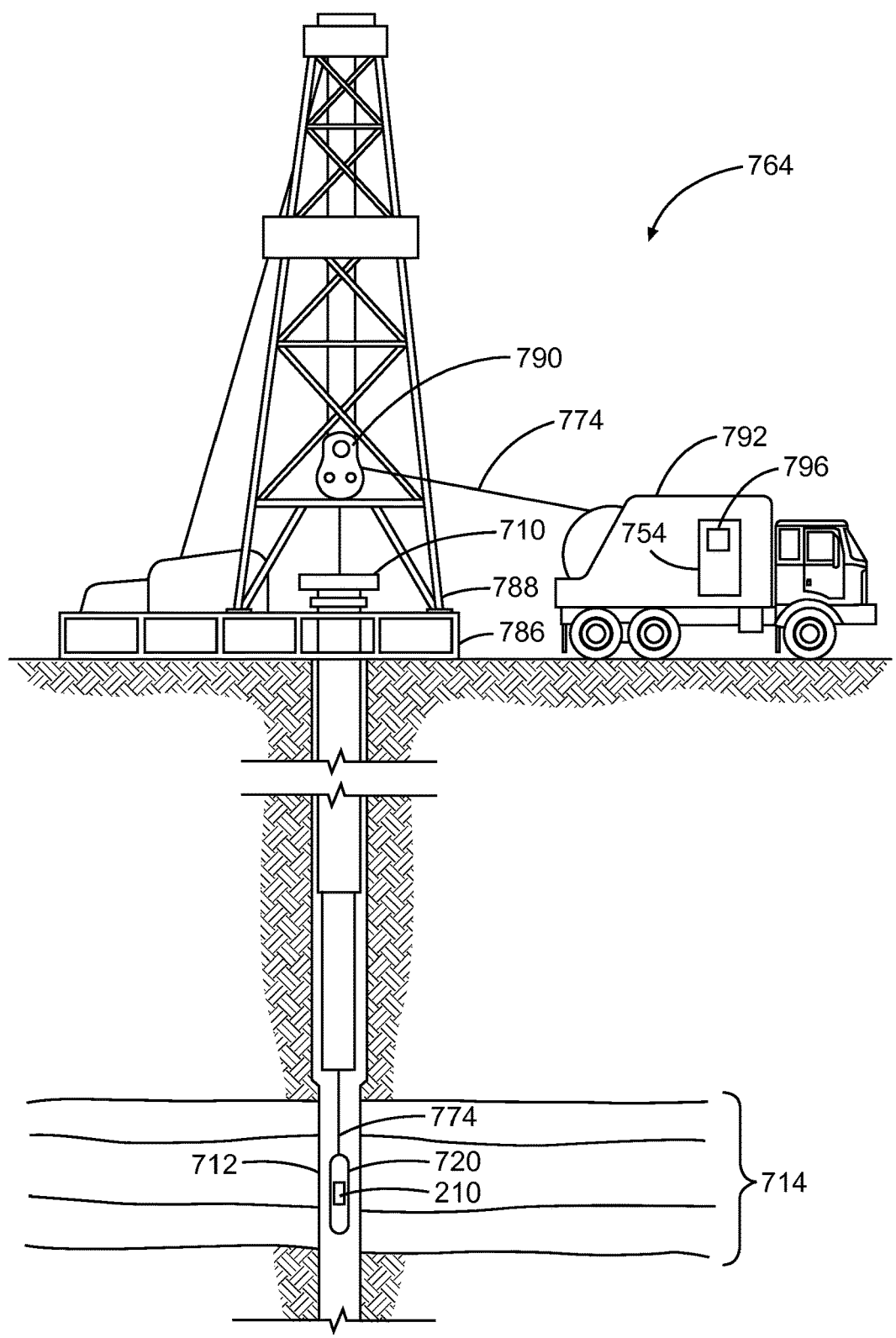
FIG. 7 is a diagram showing a wireline system, according to various embodiments of the invention.
Figure 8:
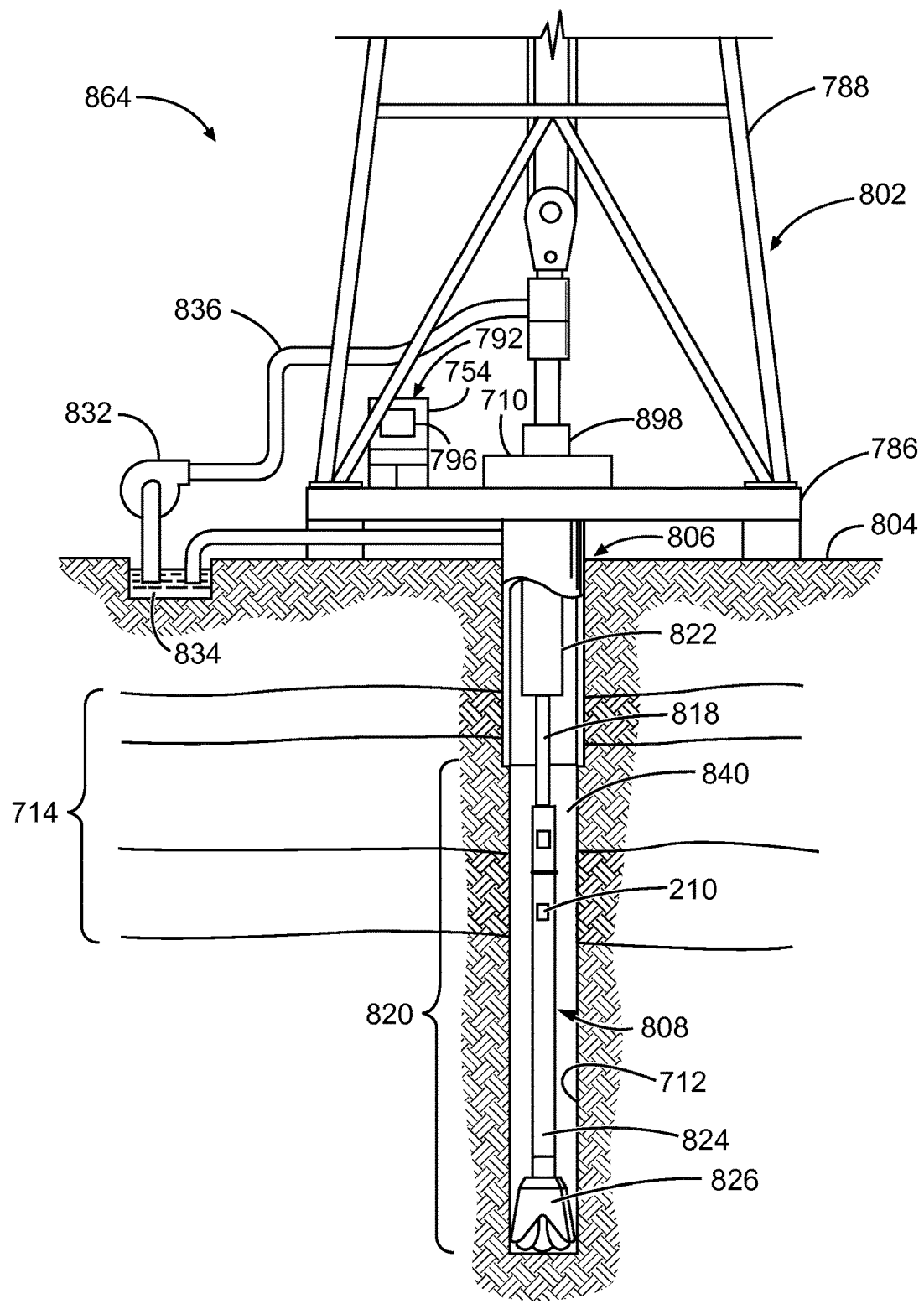
FIG. 8 is a diagram showing a drilling system, according to various embodiments of the invention.

For example, FIG. 7 is a diagram showing a wireline system 764, according to various embodiments of the invention and FIG. 8 is a diagram showing a drilling system 864, according to various embodiments of the invention. The systems 764, 864 may thus comprise portions of a wireline logging tool body 720 as part of a wireline logging operation or of a downhole tool 824 as part of a drilling operation. The wireline logging tool body 720 and/or downhole tool 824 may include the X-ray tomography device 210 as described previously.

Turning now to FIG. 7, a drilling platform 786 equipped with a derrick 788 that supports a hoist 790 can be seen. Drilling oil and gas wells is commonly carried out using a string of drill pipes connected together so as to form a drillstring that is lowered through a rotary table 710 into a wellbore or borehole 712. Here it is assumed that the drillstring has been temporarily removed from the borehole 712 to allow a wireline logging tool body 720, such as a probe or sonde with the X-ray tomography device 210, to be lowered by wireline or logging cable 774 (e.g., slickline cable) into the borehole 712. Typically, the wireline logging tool body 720 is lowered to the bottom of the region of interest and subsequently pulled upward at a substantially constant speed.

During the upward trip, at a series of depths various instruments may be used to perform X-ray measurements on the casing and cement lining the borehole 712. The wireline data may be communicated to a surface logging facility 792 for processing, analysis, and/or storage. The logging facility 792 may be provided with electronic equipment for various types of signal processing. Similar formation evaluation data may be gathered and analyzed during drilling operations (e.g., during LWD/MWD operations, and by extension, sampling while drilling).

In some embodiments, the wireline logging tool body 720 is suspended in the wellbore by a wireline cable 774 that connects the tool to a surface control unit (e.g., comprising a workstation 754). The tool may be deployed in the borehole 712 on coiled tubing, jointed drill pipe, hard wired drill pipe, or any other suitable deployment technique.

Referring now to FIG. 8, it can be seen how a system 864 may also form a portion of a drilling rig 802 located at the surface 804 of a well 806. The drilling rig 802 may provide support for a drillstring 808. The drillstring 808 may operate to penetrate the rotary table 710 and bushing 898 for drilling the borehole 712 through the subsurface formations 714. The drillstring 808 may include a drill pipe 818 and a bottom hole assembly 820 (e.g., drill string), perhaps located at the lower portion of the drill pipe 818.

The bottom hole assembly 820 may include drill collars 822, a down hole tool 824 including the X-ray tomography device 210, and a drill bit 826. The drill bit 826 may operate to create the borehole 712 by penetrating the surface 804 and the subsurface formations 714. The downhole tool 824 may comprise any of a number of different types of tools besides the X-ray tomography device 210 including MWD tools, LWD tools, and others.

During drilling operations, the drillstring 808 (perhaps including the drill pipe 818 and the bottom hole assembly 820) may be rotated by the rotary table 710. Although not shown, in addition to, or alternatively, the bottom hole assembly 820 may also be rotated by a motor (e.g., a mud motor) that is located down hole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 714.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 712. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation cuttings created by operating the drill bit 826.

The workstation 754 and the controller 796 may include modules comprising hardware circuitry, a processor, and/or memory circuits that may store software program modules and objects, and/or firmware, and combinations thereof. The workstation 754 and controller 796 may be configured to create a density and energy spectrum map of the borehole cement, according to the methods described previously.

Thus, in various embodiments, components of a system operable to conduct X-ray tomography measurements and analyze the measurements, as described herein or in a similar manner, can be realized in combinations of hardware and/or processor executed software. These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 9:
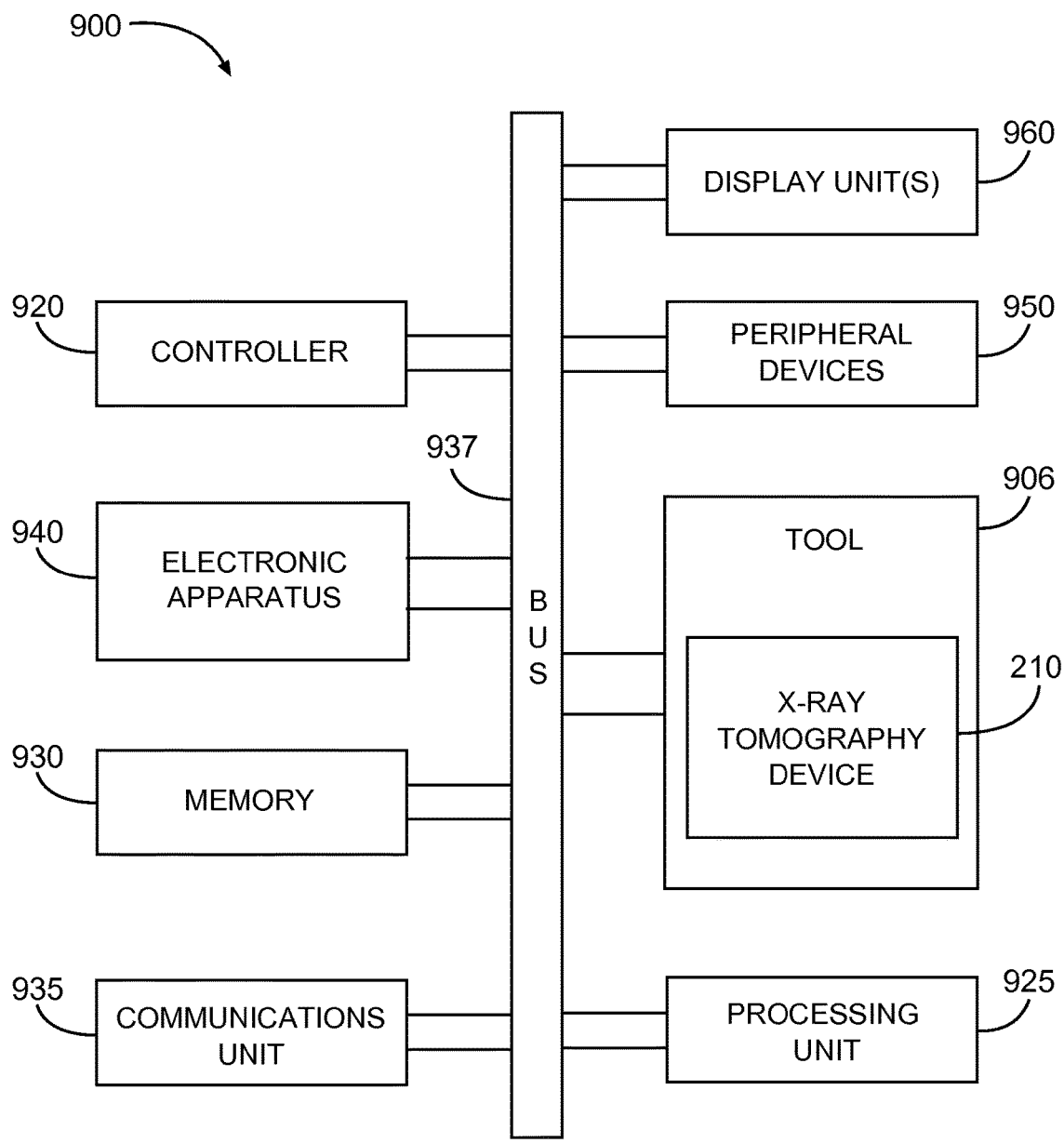
FIG. 9 is a block diagram of an example system operable to implement the activities of multiple methods, according to various embodiments of the invention.

FIG. 9 is a block diagram of an example system 900 operable to implement the activities of multiple methods, according to various embodiments of the invention. The system 900 may include a tool housing 906 having an X-ray tomography device 210 such as that illustrated in FIG. 2. The system 900 may be configured to operate in accordance with the teachings herein to perform X-ray tomography measurements and to determine the quality of cement between a casing and a formation.

The system 900 may include a controller 920, a memory 930, an electronic apparatus 940, and a communications unit 935. The memory 930 can be structured to include a database. The controller 920, the memory 930, and the communications unit 935 can be arranged to operate as a processing unit to control operation of the X-ray tomography device 210. A processing unit 925, structured to conduct such evaluation using X-ray measurement, can be implemented as a single unit or distributed among the components of the system 900 including electronic apparatus 940. The electronic apparatus 940 can provide other circuitry for operation of the system 900. The controller 920 and the memory 930 can operate in concert to control activation of the X-ray source(s) 200 (e.g. as shown in FIG. 2) of X-ray tomography device 210 to generate X-ray flux. The controller 920 and the memory 930 can also operate together to control selection of the detector(s) 915 in the tool 906 and to manage processing schemes. The controller 920, the memory 930, and other components of the system 900 can be configured, for example, to operate similar to or identical to the components discussed herein or similar to or identical to any of methods discussed herein.

The communications unit 935 can include downhole communications for appropriately located sensors in a wellbore. Such downhole communications can include a telemetry system. The communications unit 935 may use combinations of wired communication technologies and wireless technologies at frequencies that do not interfere with on-going measurements.

The system 900 can also include a bus 937, where the bus 937 provides electrical conductivity among the components of the system 900. The bus 937 can include an address bus, a data bus, and a control bus, each independently configured or in an integrated format. The bus 937 can be realized using a number of different communication mediums that allows for the distribution of components of the system 900. The bus 937 can include a network. Use of the bus 937 can be regulated by the controller 920.

In various embodiments, the peripheral devices 950 can include additional storage memory and other control devices that may operate in conjunction with the controller 920 and the memory 930. In an embodiment, the controller 920 can be realized as a processor or a group of processors that may operate independently depending on an assigned function. The controller may be configured to generate an energy spectrum for the detected photons based on a number of detected photons received at the second predetermined angle. The controller may also be configured to controller configured to generate a density map of cement in response to a photon energy and a detected photon count.

The system 900 can include display unit(s) 960 as a distributed component on the surface of a wellbore, which can be used with instructions stored in the memory 930 to implement a user interface to monitor the operation of the tool 906 or components distributed within the system 900. The user interface may be used to input parameter values for thresholds such that the system 900 can operate autonomously substantially without user intervention in a variety of applications. The user interface can also provide for manual override and change of control of the system 900 to a user. Such a user interface can be operated in conjunction with the communications unit 935 and the bus 937. Many embodiments may thus be realized. A few examples of such embodiments will now be described.

Example 1 is an X-ray tomography device comprising: an X-ray beam source configured to transmit an X-ray beam at a first predetermined angle in a downhole environment; a single pixel or multi-pixel photon detector configured to count detected photons received at a second predetermined angle; and a controller coupled to the X-ray beam source and the detector and configured to generate an energy spectrum for the detected photons based on a number of detected photons received at the second predetermined angle.

In Example 2, the subject matter of Example 1 can include a radiation shield located between the X-ray beam source and the detector.

In Example 3, the subject matter of Examples 1-2 can include a radiation shield that comprises a photon block metal.

In Example 4, the subject matter of Examples 1-3 can include a detector that is an energy dispersive, multi-pixel photon detector.

In Example 5, the subject matter of Examples 1-4 can include a detector collimator coupled to the detector and configured such that only photons received at the second predetermined angle are detected by the detector.

In Example 6, the subject matter of Examples 1-5 can include an X-ray beam source that comprises an X-ray tube.

In Example 7, the subject matter of Examples 1-6 can include a capillary device coupled to the X-ray source, the capillary device configured to transmit the X-ray beam at the first predetermined angle, with a smaller beam width than the X-ray beam from the X-ray source.

In Example 8, the subject matter of Examples 1-7 can include a detector configured to record photon counts arriving at each pixel and sort each count into different energy bins to generate the energy spectrum associated with the detected photons.

In Example 9, the subject matter of Examples 1-8 can include a detector comprising a semiconductor and counting application specific integrated circuit detector.

In Example 10, the subject matter of Examples 1-9 can include a detector comprising a scintillator and counting complementary metal oxide semiconductor imaging detector.

In Example 11, the subject matter of Examples 1-10 can include a detector comprising a continuous or pixilated detector.

Example 12 is a method for performing X-ray inspection of cement, the method comprising: transmitting an X-ray beam at a first predetermined angle; detecting backscatter photons, received at a second predetermined angle, from the cement using an energy dispersive, multi-pixel photon detector; and counting a number of photons detected at the second predetermined angle to generate a density map of the cement.

In Example 13, the subject matter of Example 12 can include use of a detector that comprises a plurality of pixels, the method further comprising determining and/or quantifying abnormalities inside the cement based on: comparing photon count-rate differences between measurements for each pixel at different depths or comparing count-rate differences between a measurement for each pixel at different depths and a predicted measurement for the respective pixel at each respective depth.

In Example 14, the subject matter of Examples 12-13 can include determining a location of a pixel on the detector at which a photon is received to determine a reflective point in the cement from which the photon was reflected.

In Example 15, the subject matter of Examples 12-14 can include the detector generating an energy spectrum for detected photons.

In Example 16, the subject matter of Examples 12-15 can include transmitting the X-ray beam in a downhole environment from a wireline tool or a drill string tool.

In Example 17, the subject matter of Examples 12-16 can include causing the wireline tool or the drill string tool to rotate such that the X-ray beam is rotated within the cement along an azimuthal angle.

Example 18 is a system comprising: a downhole tool including an X-ray tomography device, the device comprising an X-ray beam source configured to transmit an X-ray beam at a first predetermined angle; an energy dispersive, multi-pixel photon detector configured to count detected photons received at a second predetermined angle; and a controller coupled to the X-ray beam source and the detector and configured to generate an energy spectrum for the detected photons received at the second predetermined angle.

In Example 19, the subject matter of Example 18 can include a downhole tool that is a wireline tool.

In Example 20, the subject matter of Examples 18-19 can include a downhole tool that is a drill string tool.

In Example 21, the subject matter of Examples 18-20 can include an X-ray tomography device that comprises a radiation shield located between the X-ray beam source and the detector; a capillary device coupled to the X-ray beam source, the capillary device configured to transmit the X-ray beam at the first predetermined angle and reduce the X-ray beam width to a width that is less than the X-ray beam from the X-ray beam source; and a detector collimator coupled to the detector, the detector collimator configured to receive only backscatter photons received at the second predetermined angle.

In Example 22, the subject matter of Examples 18-21 can include a controller configured to generate an energy spectrum of received photons and a density map of cement in response to determining a photon energy and a detected photon count, respectively.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An X-ray tomography device for evaluating cement behind a casing of a wellbore, comprising:
   an X-ray beam source configured to transmit an X-ray beam at a first predetermined angle ($\alpha$) relative to a longitudinal axis of the wellbore in a downhole environment;
   an energy-dispersive, multi-pixel photon detector configured to count detected photons received at a second predetermined angle ($\beta$) relative to the longitudinal axis of the wellbore and to sort the detected photons into different energy categories;
   a detector collimator coupled to the detector and configured such that photons received at the second predetermined angle are detected by the detector; and
   a controller coupled to the X-ray beam source and the detector and configured to generate an energy spectrum for the detected photons based on a number of detected photons received at the second predetermined angle.

2. The X-ray tomography device of claim 1, further comprising a radiation shield located between the X-ray beam source and the detector.

3. The X-ray tomography device of claim 2, wherein the radiation shield comprises a photon blocking metal.

4. The X-ray tomography device of claim 1, wherein the X-ray beam source is an X-ray tube.

5. The X-ray tomography device of claim 1, further comprising a capillary device coupled to the X-ray source, the capillary device configured to transmit the X-ray beam at the first predetermined angle and with a smaller beam width than the X-ray beam from the X-ray source.

6. The X-ray tomography device of claim 1, wherein the detector is configured to record photon counts arriving at each pixel and sort each count into different energy bins.

7. The X-ray tomography device of claim 6, wherein the detector comprises a semiconductor and a counting application specific integrated circuit detector.

8. The X-ray tomography device of claim 6, wherein the detector comprises a scintillator and a counting complementary metal oxide semiconductor imaging detector.

9. A method for performing X-ray inspection of cement behind a casing of a wellbore in a downhole environment, the wellbore having a longitudinal axis, the method comprising:
   transmitting an X-ray beam into the cement at a first predetermined angle ($\alpha$) relative to the longitudinal axis of a wellbore;
   detecting backscatter photons received from the cement at a second predetermined angle ($\beta$) relative to the longitudinal axis of the wellbore, using an energy dispersive, multi-pixel photon detector with a detector collimator coupled to the detector and configured such that photons received at the second predetermined angle are detected by the detector and sorted into different energy categories; and
   counting a number of photons detected at the second predetermined angle to generate a density map of the cement, and generate an energy spectrum for the detected photons.

10. The method of claim 9, wherein the detector comprises a plurality of pixels, the method further comprising determining abnormalities inside the cement based on: comparing photon count-rate differences between measurements for each pixel at different depths or comparing count-rate differences between a measurement for each pixel at different depths and a predicted measurement for the respective pixel at each respective one of the different depths.

11. The method of claim 9, further comprising determining a location of a pixel on the detector at which a photon is received to determine a reflective point in the cement from which the photon was reflected.

12. The method of claim 9, further comprising transmitting the X-ray beam in the downhole environment from a wireline tool or a drill string tool.

13. The method of claim 12, further comprising rotating the wireline tool or the drill string tool such that the X-ray beam is rotated in an azimuthal direction within the cement.

14. A system comprising:
   a downhole tool including an X-ray tomography device for evaluating cement behind a casing of a wellbore having a longitudinal axis, the device comprising:
      an X-ray beam source configured to transmit an X-ray beam at a first predetermined angle ($\alpha$) relative to the longitudinal axis of a wellbore in a downhole environment;
      an energy dispersive, multi-pixel photon detector configured to count detected photons received at a second predetermined angle ($\beta$) relative to the longitudinal axis of the wellbore and to sort the detected photons into different energy categories;
      a detector collimator coupled to the detector, the detector collimator configured to receive only backscatter photons received at the second predetermined angle; and
      a controller coupled to the X-ray beam source and the detector and configured to generate an energy spectrum for the detected photons received at the second predetermined angle.

15. The system of claim 14, wherein the X-ray tomography device is disposed in a wireline tool or a drill string tool.

16. The system of claim 14, wherein the X-ray tomography device further comprises:
   a radiation shield located between the X-ray beam source and the detector; and
   a capillary device coupled to the X-ray beam source, the capillary device configured to transmit the X-ray beam at the first predetermined angle and reduce the X-ray beam width to a width that is less than the X-ray beam from the X-ray beam source.

* * * * *